United States Patent Office 2,871,120
Patented Jan. 27, 1959

2,871,120

AZINE CYAN COLOR FORMERS

Robert F. Coles, Vestal, and Vsevolod Tulagin, Binghamton, N. Y., assignors to General Aniline & Film Corporation, New York, N. Y., a corporation of Delaware No Drawing. Application November 18, 1955
Serial No. 547,866

6 Claims. (Cl. 96—55)

The present invention relates to azine cyan color formers of the J-acid type in which the nitrogen atom in the 6-position of J-acid is converted to a tertiary amino group by the introduction of a benzyl group on the one hand and an aryl or another benzyl group on the other hand.

U. S. Patent 2,486,440, granted November 1, 1949, to W. A. Schmidt and V. Tulagin describes the formation of azine dye images in photographic elements by developing such elements in the presence of a color former with a 2,4-diamino aniline, preferably a 4,6-diamino metanilic acid. Among the color formers suggested for formation of a cyan azine dye image there is mentioned 6-anilino-1-naphthol-3-sulfonic acid. This acid, because of its structure would appear to be suitable for use as a cyan azine color former, but research has established certain objections to this compound for such purposes. Efforts were made to overcome these difficulties by modification of the structure of the aryl J-acids, and these are reported in U. S. Patent 2,480,815 granted August 30, 1949, to V. Tulagin and W. A. Schmidt and U. S. Patent 2,591,642 granted April 1, 1952, to V. Tulagin and R. F. Coles.

The J-acid derivatives of the latter patent, while constituting a decided improvement over the prior compounds, nevertheless, suffered as all previously employed J-acids had from the disadvantage that the cyan dyes obtained therewith are deficient in the desirable green portion of the spectrum.

Considerable attention has been devoted to procuring cyan azine color formers which would exhibit an increased brilliance and a greater green transmission than those heretofore employed. As a result of this study, we have found that compounds more closely approximating these prerequisites can be obtained by introducing a benzyl group on the amino nitrogen in the 6-position of N-monoaryl J-acids or by disubstitution of the amino group in 6-amino-1-naphthol-3-sulfonic acid by a benzyl group.

Such color formers, the preparation of light sensitive color materials containing the same and the processing of such color materials constitute the purposes and objects of the present invention.

The color formers, whose preparation and use are contemplated herein, are represented by the following structural formula:

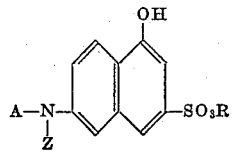

wherein A is a benzyl radical, i. e., benzyl; nitrobenzyl; aminobenzyl; carboxybenzyl; acylaminobenzyl; i. e., acetylaminobenzyl; tetradecanoylaminobenzyl; alkylcarbamylbenzyl, i. e., methylcarbamylbenzyl; heptadecylcarbamylbenzyl; octadecylcarbamylbenzyl; arylcarbamylbenzyl; i. e., phenylcarbamylbenzyl; tolylcarbamylbenzyl; tetradecanoylaminotoluylcarbamylbenzyl; sulfobenzyl; halogenated benzyl; i. e., chlorbenzyl, brombenzyl or the like; Z is a benzyl radical like A above, or a radical of aromatic character of the benzene, naphthalene, pyridine or quinoline series, Z in the above formula corresponding to character A in the compounds described in our prior U. S. Patent 2,591,642. Such radical of aromatic character may be, for instance, a phenyl radical, i. e., phenyl; toluyl; carboxyphenyl; alkylcarbamylphenyl, i. e., methylcarbamylphenyl, tetradecylcarbamylphenyl, heptadecylcarbamylphenyl; arylcarbamylphenyl, i. e., phenylcarbamylphenyl, toluylcarbamylphenyl, tridecanoylaminophenylcarbamylphenyl, tetradecanoylaminotoluylcarbamylphenyl; a naphthyl radical, i. e., naphthyl; carboxynaphthyl; alkylcarbamylnaphthyl, i. e., dodecylcarbamylnaphthyl; alkylcarbamylalkoxynaphthyl, i. e., octadecylcarbamylmethoxynaphthyl; a pyridyl radical, i. e., pyridyl; a quinolyl radical, i. e., quinolyl; alkylcarbamylquinolyl, i. e., octadecylcarbamylquinolyl and the like, and R is hydrogen or an alkali metal, such as sodium, potassium or the like.

It is to be pointed out that if the color formers are to be used in the photographic emulsion, then either A or Z must contain an aliphatic radical having a chain of at least 10 carbon atoms, or an aromatic radical containing an aliphatic chain of at least 10 carbon atoms. On the other hand, if the color formers are to be used in the azine developer, then they should be free from such long aliphatic chains to facilitate their diffusion from the developer into the emulsion.

Examples of compounds embraced by the above general formula, and which we have found to partake of the aforesaid prerequisites are the following:

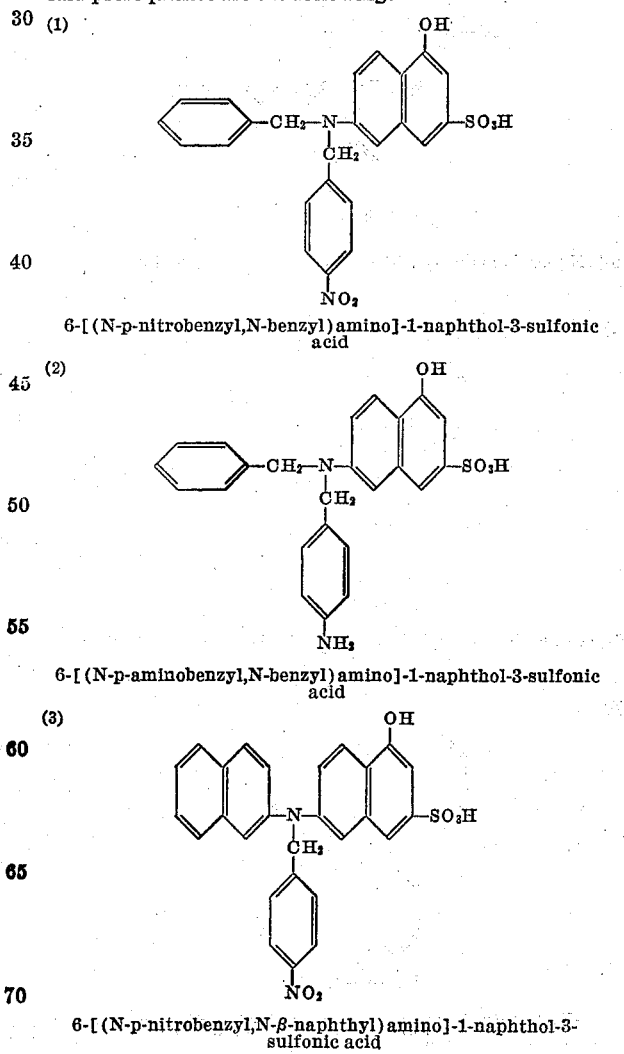

(4)
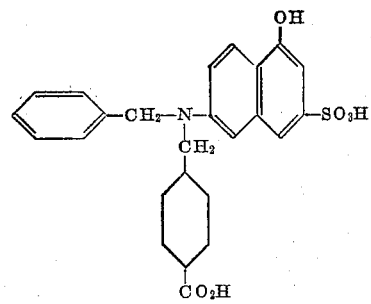
6-[(N-p-carboxybenzyl,N-benzyl)amino]-1-naphthol-3-sulfonic acid (5)
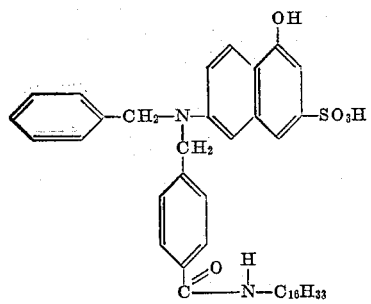
ω-[N-benzyl-N-2-(5-hydroxy-7-sulfonaphthyl)]amino-p-toluoylhexadecylamide (6)
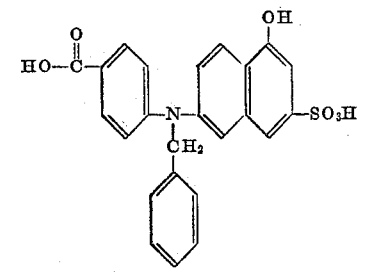
6-[(N-p-carboxyphenyl,N-benzyl)amino]-1-naphthol-3-sulfonic acid (7)
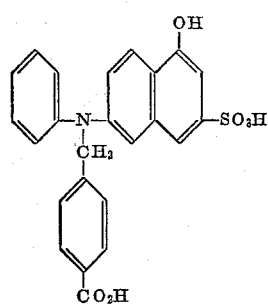
6-[(N-p-carboxybenzyl,N-phenyl)amino]-1-naphthol-3-sulfonic acid (8)
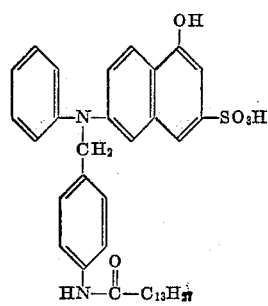
6-[N-(p-tetradecanoylaminobenzyl,N-phenyl)amino]-1-naphthol-3-sulfonic acid (9)
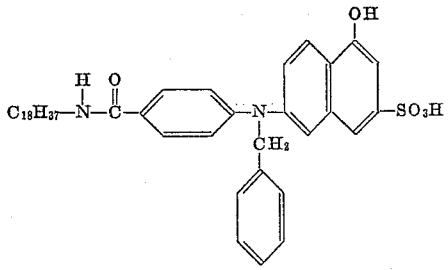
6-[N-(p-octadecylcarbamylphenyl,N-benzyl)amino]-1-naphthol-3-sulfonic acid

(10)
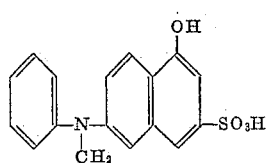
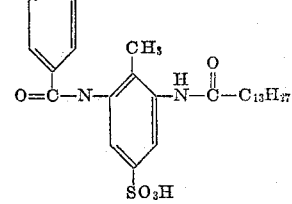
6-[N-(p-(6'-lauroylamino-4'-sulfo-2'-tolylcarbamyl)benzyl,N-phenyl)amino]-1-naphthol-3-sulfonic acid

(11)
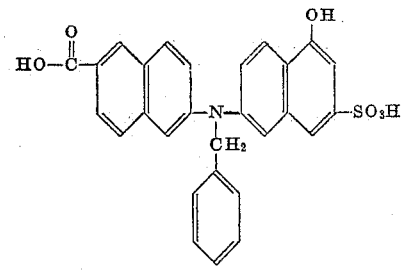
6-[N-(6'-carboxy-β-naphthyl,N-benzyl)amino]-1-naphthol-3-sulfonic acid

(12)
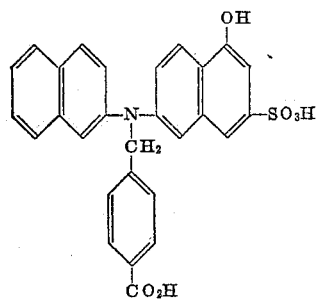
6-[N-(p-carboxybenzyl,N-β-naphthyl)amino]-1-naphthol-3-sulfonic acid

(13)
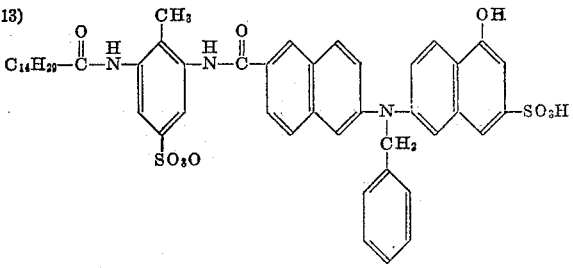
6-[N-(6'(6''-tetradecanoylamino-4''-sulfo-2''-tolylcarbamyl)-2-naphthyl,N-benzyl)amino]-1-naphthol-3-sulfonic acid (14)

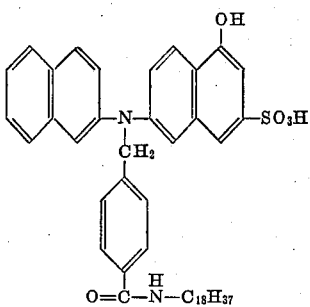

6-[N-(p-octadecylcarbamylbenzyl,N-β-naphthyl)amino]-1-naphthol-3-sulfonic acid (15)

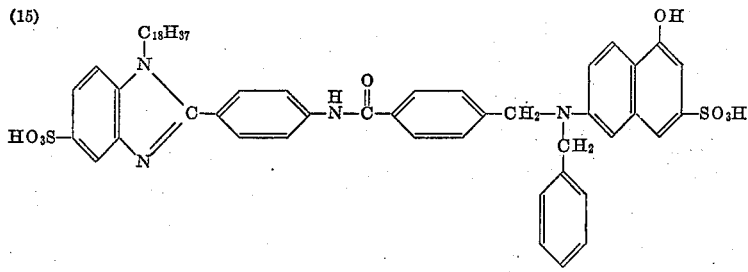

6-[N-4'-(1-octadecyl-5-sulfo-2-benzimidazyl)phenylcarbamyl-benzyl,N-benzylamino]-1-naphthol-3-sulfonic acid The following examples will serve to illustrate the invention, although it is to be understood that the invention is not restricted thereto.

PREPARATION OF BENZYL-J ACIDS

EXAMPLE I

*6-[(N-p-nitrobenzyl, N-benzyl)amino]-1-naphthol-3-sulfonic acid*

A mixture of benzyl-J-acid (33.2 grams) sodium acetate (33 grams) and water (150 ml.) was placed in a 500 ml. 3-necked flask, equipped with a stirrer and reflux condenser. After heating to near reflux, p-nitrobenzylbromide (22 grams) was added and the heating continued for 15–20 minutes. The solution was acidified with hydrochloric acid and the solid collected by filtration. The nearly dry product was suspended in hot methanol (400 ml.) and treated with potassium acetate until dissolved. After cooling, the solid was collected by filtration and washed with fresh methanol in which the potassium salt was now quite insoluble. The product was then recrystallized from water containing a small amount of potassium acetate to yield 22 grams of purified material.

EXAMPLE II

*6-[(N-p-aminobenzyl, N-benzyl)amino]-1-naphthol-3-sulfonic acid*

This product was obtained from Example I by reduction with hot alkaline sodium hydrosulfite.

EXAMPLE III

*6-[(N-p-nitrobenzyl, N-β-naphthyl)amino]-1-naphthol-3-sulfonic acid*

A mixture of β-naphthyl-J-acid, sodium salt (18 grams) sodium acetate (16.4 grams) glacial acetic acid (9.5 ml.) and water (150 ml.) was heated to near reflux in a 500 ml. 3-necked flask, equipped with a stirrer and condenser. p-Nitrobenzylbromide (11 grams) were added and the mixture heated at reflux for 1 hour. An additional 3 grams of the bromide were added and after an additional ½ hour at reflux, the reaction mixture was filtered hot. The gum which separated on cooling the filtrate was collected by decanting the supernatant liquid and then redissolved in 150 ml. hot water. After cooling to room temperature, the solution was filtered from the small amount of crystalline organic material and the filtrate acidified to pH 1 with hydrochloric acid. The resulting gummy solid was triturated with 6 N hydrochloric acid and the solid collected. After sucking the solid as dry as possible on a Buchner funnel, the solid was extracted with 50 ml. of hot methanol. The residual solid was dissolved in hot water with the aid of an excess of sodium acetate. Brine was added and the crystalline sodium salt collected.

EXAMPLE IV

*6-[(N-p-carboxybenzyl, N-benzyl)amino]-1-naphthol-3-sulfonic acid*

In a 500 ml. 3-necked flask equipped with a stirrer and reflux condenser, was placed a hot solution of benzyl-J-acid (16.6 grams) and sodium acetate (16.4 grams) in 150 ml. of water. After heating to reflux, p-carboxybenzylbromide (10.6 grams) was added and the heating continued for 2 hours. The gum obtained after cooling and treating with 30% brine solution was redissolved in 150 ml. of hot water and the solution strongly acidified with 6 N hydrochloric acid. The solid was collected by filtration and extracted with methanol. Purification was finally effected by dissolving the product in hot water with the aid of sodium acetate and allowing to cool after the addition of sufficient brine to induce crystallization. The white crystalline solid was collected by filtration, washed with acetone and dried.

EXAMPLE V

*ω-[N-benzyl-N-2-(5-hydroxy-7-sulfonaphthyl)amino]-p-toluoylhexadecylamine*

In a 500 ml. 3-necked flask, equipped with a stirrer, dropping funnel, and reflux condenser fitted with a water take-off tube, was placed a mixture of the J-acid derivative of Example IV (8.75 grams) hexadecylamine (3.6 grams) dry pyridine (75 ml.) and dry benzene (35 ml.). The resulting solution was dried by heating at reflux for ½ hour. Phosphorus trichloride (0.7 ml.) in 20 ml. of dry benzene was added dropwise at reflux while stirring. The benzene was removed by the water take-off trap at reflux and the residual solution heated for an additional 3 hours. The remaining solvent was then removed at reduced pressure until a thin syrup remained which was then poured into ice and water and acidified with acetic acid. The waxy material was separated from the liquor, extracted with dilute acetic acid and brine added to coagulate the material. The solid was then extracted with acetone, dissolved in about 75 ml. of glacial acetic acid, filtered and the filtrate diluted to 300 ml. with water. The product was collected by filtration, extracted with acetone and dried.

EXAMPLE VI

*6-[(N-p-carboxyphenyl, N-benzyl)amino]-1-naphthol-3-sulfonic acid*

This product was prepared in the same manner as the compound of Example III, while substituting p-carboxyphenyl-J-acid for β-naphthyl-J-acid, and benzylbromide for p-nitrobenzylbromide.

EXAMPLE VII

*6-[(N-p-carboxybenzyl, N-phenyl)amino]-1-naphthol-3-sulfonic acid*

This product was prepared in the same manner as the compound of Example IV, while substituting phenyl-J-acid for benzyl-J-acid.

EXAMPLE VIII

*6-[N-p-tetradecanoylaminobenzyl, N-phenyl)amino]-1-naphthol-3-sulfonic acid*

This product was obtained by acylation of the corresponding p-aminobenzyl derivative with myristoyl-chloride in dry pyridine.

EXAMPLE IX

*6-[(N-p-octadecylcarbamylphenyl, N-benzyl)amino]-1-naphthol-3-sulfonic acid*

This product was obtained in the same manner as that of Example V, while substituting 6-[(N-p-carboxyphenyl, N-benzyl)amino]-1-naphthol-3-sulfonic acid for the J-acid derivative of Example IV and octadecylamine for hexadecylamine.

EXAMPLE X

*6 - [(N - p - (6' - tetradecanoylamino - 4' - sulfo - 2'-tolylcarbamyl)benzyl, N - phenyl)amino] - 1 - naphthol-3-sulfonic acid*

This product was prepared in the same manner as that of Example V, while substituting 2-amino-6-tetradecanoylamino-toluene-4-sulfonic acid for hexadecylamine, and the product from Example VIII for the J-acid derivative of Example IV.

EXAMPLE XI

*6-[(N-6'-carboxynaphthyl, N-benzyl)amino]-1-naphthol-3-sulfonic acid*

This product was prepared in the same manner as that of Example III, while using 6'-carboxynaphthyl-J-acid and benzylbromide.

EXAMPLE XII

*6-[(N-p-carboxybenzyl, N-β-naphthyl)amino]-1-naphthol-3-sulfonic acid*

This product was prepared in the same manner as that of Example IV, with the substitution of β-naphthyl-J-acid for benzyl-J-acid.

EXAMPLE XIII

*6 - [N - (6'(6''-tetradecanoylamino-4''-sulfo-2''-tolylcarbamyl) - 2 - naphthyl, N-benzyl)amino]-1-naphthol-3-sulfonic acid*

This product was prepared from the product of Example XI and 6-tetradecanoylamino-2-aminotoluene-4-sulfonic acid by a "phosphazo" reaction with phosphorus trichloride in dry pyridine (see U. S. P. 2,508,860 granted May 23, 1950).

EXAMPLE XIV

*6-[(N-p-octadecylcarbamylbenzyl, N-β-naphthyl)amino]-1-naphthol-3-sulfonic acid*

This product was prepared from the product from Example XII while using the method of Example V and substituting octadecylamine for hexadecylamine.

USE OF NON-DIFFUSING COLOR FORMERS IN SILVER HALIDE EMULSIONS

EXAMPLE XV

A photographic silver halide emulsion containing per kilo of emulsion 15 grams of the color former of Example V is exposed, the latent image developed in a Metol-hydroquinone developer, re-exposed, and the residual silver halide developed for 10 minutes in a solution of the following composition:

| | |
|---|---:|
| Potassium carbonate _____ grams__ | 20 |
| Sodium sulfite _____ do____ | 60 |
| Ethylene diamine _____ cc__ | 30 |
| 4 - (β - hydroxyethylamino) - 6-phenylamino-metanilic acid _____ grams__ | 3 |
| Water _____ cc__ | 1000 |

The developer silver images are bleached with potassium ferricyanide and fixed in an acid hardening hypo solution. There is thus obtained a brilliant cyan azine dye.

EXAMPLE XVI

An integral tripack having as the bottom layer a red sensitive emulsion containing as the cyan color former the product of Example XIII, as the middle layer a green sensitive emulsion containing as the magenta color former 2-stearoylamino-6-(8'-hydroxycinchinoylamino)-toluene-4-sulfonic acid, and as the outermost layer a blue sensitive emulsion containing as the yellow color former 2 - (benzoylacetamidophenyl) - 1-octadecyl-5-benzimidazole sulfonic acid, was exposed, developed in black and white, re-exposed and the residual silver halide developed for 12 minutes in a developer of the following composition:

| | |
|---|---:|
| 4 - (β - hydroxyethylamino) - 6-phenylaminometanilic acid _____ grams__ | 8 |
| Potassium carbonate _____ do____ | 20 |
| Sodium sulfite _____ do____ | 60 |
| Potassium bromide _____ do____ | 10 |
| Benzylamine _____ do____ | 5 |
| Water _____ cc__ | 1000 |

The film after development is washed, bleached in a ferricyanide bleach, and fixed in an acid hardening hypo solution. There is thus obtained a positive dyestuff image in each of the three layers—a brilliant cyan dye image in the bottom layer, a magenta dye image in the middle layer, and a yellow dye image in the top layer.

Various modifications of the invention will occur to persons skilled in the art and we, therefore, do not intend to be limited in the patent granted except as necessitated by the appended claims.

We claim:

1. A photographic silver halide emulsion containing as a color former fast to diffusion a compound of the following formula:

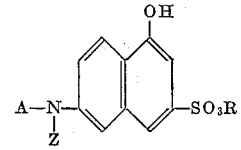

wherein A is a benzyl radical, Z is a radical selected from the class consisting of a benzyl radical and those of the benzene, naphthalene, pyridine and quinoline series, and R is selected from the class consisting of hydrogen and a cationic salt forming group.

2. The article as defined in claim 1, wherein one of the radicals A and Z contains an aliphatic carbon chain of at least 10 carbon atoms.

3. The process of producing brilliant cyan azine dye images having a high green transmission which comprises developing with a 2,4-diamino aniline developer an exposed silver halide emulsion in the presence of a color former of the following formula:

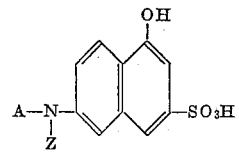

wherein A is a benzyl radical, Z is a radical selected from the class consisting of a benzyl radical and those of the benzene, naphthalene, pyridine and quinoline series, and R is selected from the class consisting of hydrogen and a cationic salt forming group.

4. The composition as defined in claim 1, wherein the color former is ω-[N-benzyl-N-2-(5-hydroxy-7-sulfonaphthyl)amino]-p-toluoyl-hexadecylamine.

5. The composition as defined in claim 1, wherein the color former is 6-[N-(6'(6''-tetradecanoylamino-4''-sulfo - 2'' - tolylcarbamyl)-2-naphthyl, N-benzyl)amino]-1-naphthol-3-sulfonic acid.

6. The composition as defined in claim 1, wherein the color former is 6-[N-4'-(1-octadecyl-5-sulfo-2-benzimidazyl)phenylcarbamylbenzyl, N - benzylamino] - 1-naphthol-3-sulfonic acid.

References Cited in the file of this patent

FOREIGN PATENTS

| | | |
|---|---|---|
| 640,109 | Great Britain | July 12, 1950 |
| 691,989 | Great Britain | May 27, 1953 |

UNITED STATES PATENT OFFICE
Certificate of Correction

Patent No. 2,871,120                      January 27, 1959

Robert F. Coles et al.

It is hereby certified that error appears in the printed specification of the above numbered patent requiring correction and that the said Letters Patent should read as corrected below.

Column 4, lines 15 to 31, Formula (10) should appear as shown below instead of as in the patent:

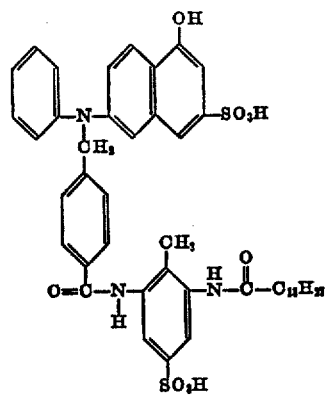

Signed and sealed this 23rd day of June 1959.

[SEAL]

Attest:
KARL H. AXLINE,
Attesting Officer.

ROBERT C. WATSON,
Commissioner of Patents.